United States Patent
Muto et al.

(10) Patent No.: US 6,806,973 B1
(45) Date of Patent: Oct. 19, 2004

(54) IMAGE TRANSMITTING APPARATUS AND IMAGE FORMING APPARATUS

(75) Inventors: Satoshi Muto, Toyokawa (JP); Sadanobu Murasaki, Okazaki (JP); Masatomo Matsubara, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/197,524

(22) Filed: Nov. 23, 1998

(30) Foreign Application Priority Data

Nov. 21, 1997 (JP) .............................. 9-320849
Oct. 14, 1998 (JP) ............................ 10-291842

(51) Int. Cl.⁷ .............................................. G06F 15/00
(52) U.S. Cl. ..................... 358/1.13; 358/1.15
(58) Field of Search ................... 358/1.12, 1.13, 358/1.14, 1.15, 400, 402, 403, 434, 440

(56) References Cited

U.S. PATENT DOCUMENTS

| | | | | |
|---|---|---|---|---|
| 4,044,232 A | * | 8/1977 | Hubbard | 399/16 |
| 4,695,895 A | * | 9/1987 | Nagashima | 358/426 |
| 5,497,247 A | * | 3/1996 | Yoshida | 358/436 |
| 5,689,755 A | | 11/1997 | Ataka | 399/9 |
| 5,757,379 A | | 5/1998 | Saito | 345/323 |
| 5,808,753 A | * | 9/1998 | Yoshida | 358/437 |
| 5,911,037 A | * | 6/1999 | Yoshida | 358/1.16 |
| 5,991,050 A | * | 11/1999 | Mathur et al. | 358/400 |

FOREIGN PATENT DOCUMENTS

JP       7-221914       8/1995

* cited by examiner

Primary Examiner—Mark Wallerson
(74) Attorney, Agent, or Firm—Burns, Doane, Swecker & Mathis, L.L.P.

(57) ABSTRACT

An image transmitting apparatus and an image forming apparatus are provided whereby when the image transmitting apparatus transmits to the image forming apparatus data designating that multiple sets of identical images are to be printed. The user of the image forming apparatus can correctly understand that multiple sets of identical images have been sent.

15 Claims, 10 Drawing Sheets

TRANSMISSION DATE AND TIME | RECIPIENT NAME | SENDER NAME | TELEPHONE NUMBER OF SENDER | PAGE NUMBER

JAN.01'98 12:03  To:Mr.AAA  From:Minolta Co.Ltd.,(+81 XX XXX XXXX)  P 002/002

JAN.01'98 12:00  To:Mr.AAA  From:Minolta Co.Ltd.,(+81 XX XXX XXXX)  P 001/002

IMAGE TRANSMITTING APPARATUS AND IMAGE FORMING APPARATUS

This application is based on applications Nos. Hei 9-320849 and Hei 10-291842 filed in Japan, the contents of which are hereby incorporated by reference.

FIELD OF THE INVENTION

The present invention pertains to an image transmitting apparatus such as a facsimile machine or a copying machine having a facsimile function, and to an image forming apparatus connected in a network.

DESCRIPTION OF THE RELATED ART

Conventionally, a facsimile is employed to send an image to a distant location by means of transmission lines such as telephone wires. In addition, an apparatus also exists that has a function in which when one set of original image data and data designating the number of sets to be output are sent from the transmitting facsimile, the receiving facsimile outputs the designated number of images.

However, when the conventional facsimile described above is used on the sending side, where the receiving facsimile lacks a function to process the sent data designating the number of sets to be output, the receiving facsimile cannot print out the number of sets designated by the sending side from the one set of original image data.

Even where the receiving facsimile does have a function to process the sent data designating the number of sets to be output, where the receiving facsimile prints out multiple sets of images, the user of the receiving facsimile may determine that multiple sets of identical images were printed by mistake and save only one of the printed sets and discard the rest.

In other words, with conventional facsimile technology, even where the transmitting facsimile (the image transmitting apparatus) sends data to the receiving facsimile designating that multiple sets of identical images are to be printed out, the problem exists that the user of the receiving facsimile cannot correctly understand that multiple sets of identical images have been sent.

SUMMARY OF THE INVENTION

The present invention was created to resolve these problems. Its object is to provide an image transmitting apparatus and an image forming apparatus whereby when the image transmitting apparatus transmits to the image forming apparatus data designating that multiple sets of identical images are to be printed, the user of the image forming apparatus can correctly understand that multiple sets of identical images have been sent.

The image transmitting apparatus pertaining to one aspect of the present invention comprises an image transmitting apparatus that sends one set of original image data to the image forming apparatus that forms images based on the original image data and designates the number of sets of images to be formed by the image forming apparatus based on the original image data, wherein the image transmitting apparatus has a transmitting means that, where the image forming apparatus is not capable of forming the designated number of sets of images based on the image data of one set of original images, performs multiple transmissions of the original image data so that the designated number of sets of images will be formed.

With this construction, where the image forming apparatus cannot form the number of designated sets of images based on the single set of original images transmitted, the image transmitting apparatus transmits the original image data multiple times.

As a result, the designated number of sets of images can be formed even where the image forming apparatus is not equipped with a function to process data from the image transmitting apparatus designating that multiple sets of images are to be printed out.

The image transmitting apparatus pertaining to another aspect of the present invention has a transmitting means that, where the original image data is transmitted multiple times in order that the designated number of sets of images will be formed, transmits, in addition to the designated multiple sets of images, image formation data that notifies the image forming apparatus that the image data was transmitted multiple times.

With this construction, where the image transmitting apparatus transmits the original image data multiple times in order that the designated number of sets of images will be formed, the image forming apparatus forms images that indicate in the images based on the original images that one set of original image data was transmitted multiple times.

As a result, the user of the image forming apparatus can recognize that multiple sets of images were formed from one set of original images because the image transmitting apparatus sent the image data multiple times.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
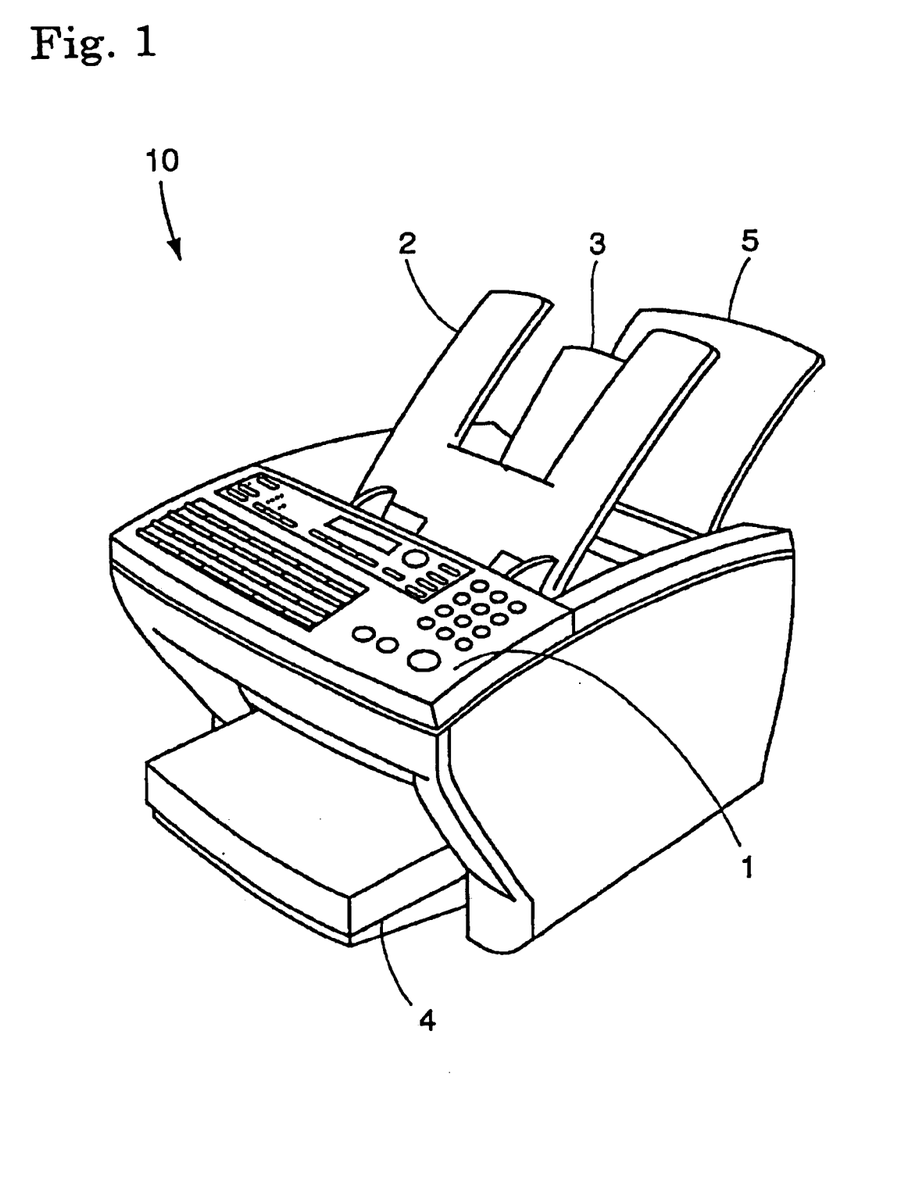
FIG. 1 is an external view of the facsimile of the present invention.

FIG. 1 is an external view of a facsimile comprising one embodiment of the image transmitting apparatus and image forming apparatus of the present invention.

The facsimile 10 comprises mainly an operation panel 1, an original document feeding tray 2, an original document eject tray 3, a recording sheet feeding tray 4, and a recording sheet eject tray 5. The telephone number to the receiving facsimile, the facsimile operation mode, the print settings for the receiving facsimile, etc., are input by means of the operation panel 1. When the user presses the prescribed key on the operation panel 1, the images on the original document located on the original document feeding tray 2 are optically read one page at a time, the image data undergoes photoelectric conversion and is then transmitted to the receiving facsimile via telephone lines together with the data indicating the print settings for the receiving facsimile. The original document from which images are read is ejected onto the original document eject tray 3 one page at a time.

Here, the print settings for the receiving facsimile input from the operation panel 1 include the number of sets of images to be printed by the receiving facsimile based on the single set of transmitted original images, and the names of the receiving parties corresponding to the number of sets printed. In addition, instead of performing the input operation using the keys on the operation panel 1, the inputting may be performed by means of a prescribed mark sheet filled out beforehand.

When image data has been transmitted, recording sheets are fed from the recording sheet feeding tray 4 and the images are printed onto the recording sheets based on the transmitted image data. When printing is completed, the sheets onto which images were printed are ejected onto the recording sheet eject tray 5 one page at a time.

Figure 2:
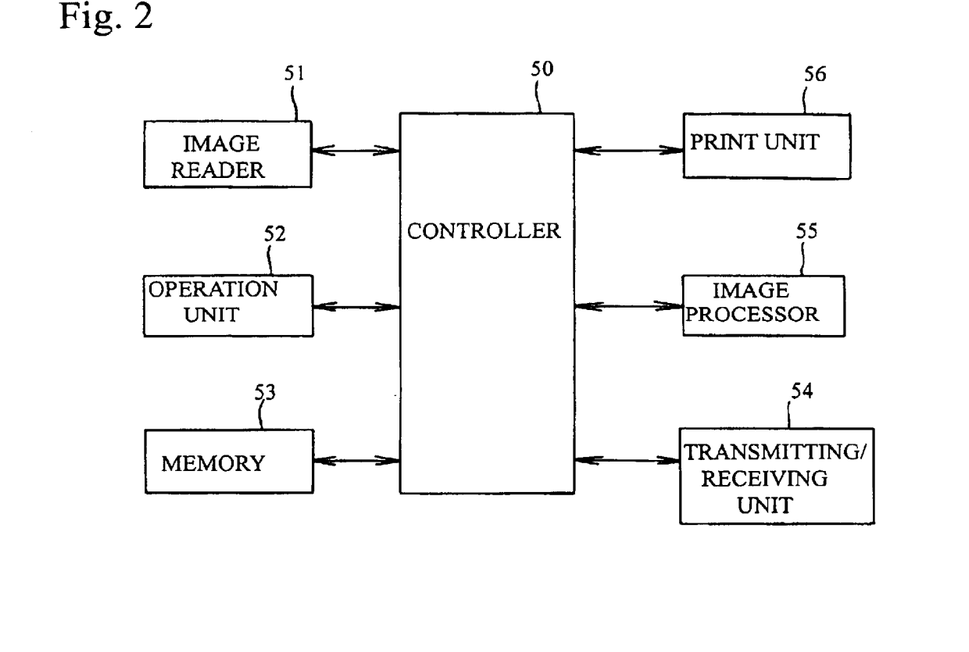
FIG. 2 is a block diagram showing the construction of the facsimile of FIG. 1.

FIG. 2 is a drawing that summarizes the control of the transmission and receiving of data from and to the facsimile 10. In the facsimile 10, a controller 50 comprising a CPU, a ROM, and a RAM is connected to an image reader 51 to read images for transmission, an operation unit 52 (including the operation panel 1 in FIG. 2) to perform the inputting operations needed to carry out prescribed operations in connection with transmitting and receiving, a memory unit 53 to store the transmitted and received image data as needed, a transmitting/receiving unit 54 to perform transmission and receiving of image data, an image processor 55 to perform processing of the image data, and a print unit 56 to print images based on the processed image data.

When original document images are transmitted, the user sets the original document on the original document feeding tray 2 (see FIG. 1) and performs the prescribed inputting using the operation panel 1. When the apparatus is instructed via the operation panel 1 to begin transmission, the facsimile 10 reads the original document images by means of the image reader 51 and generates image data corresponding to the original document, based on the control by the controller 50. The generated image data is temporarily stored in the memory unit 53, it undergoes image processing by means of the image processor 55, and it is then transmitted by the transmitting/receiving unit 54 to the transmitting/receiving unit of the receiving facsimile.

In addition, when images are received, image data is received from the transmitting/receiving unit 54 and this image data is temporarily stored in the memory unit 53, based on the control by the controller 53. After the image data undergoes image processing by means of the image processor 55, the facsimile 10 prints out the images by means of the print unit 56 based on the image data that has undergone image processing.

Figure 3:
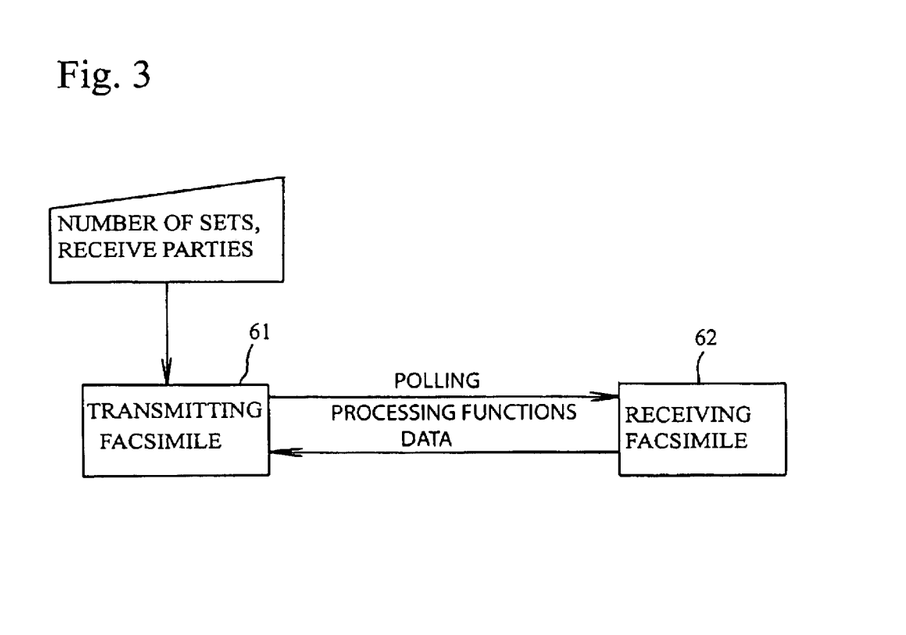
FIGS. 3, 4 and 5 are drawings explaining the sequence of operations by which original images are transmitted in the present invention.
Figure 4:
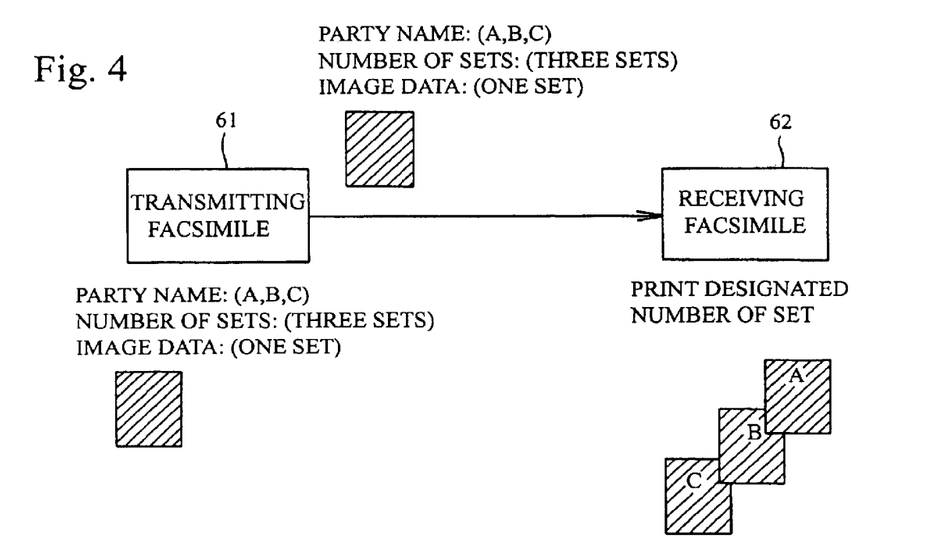
Figure 5:
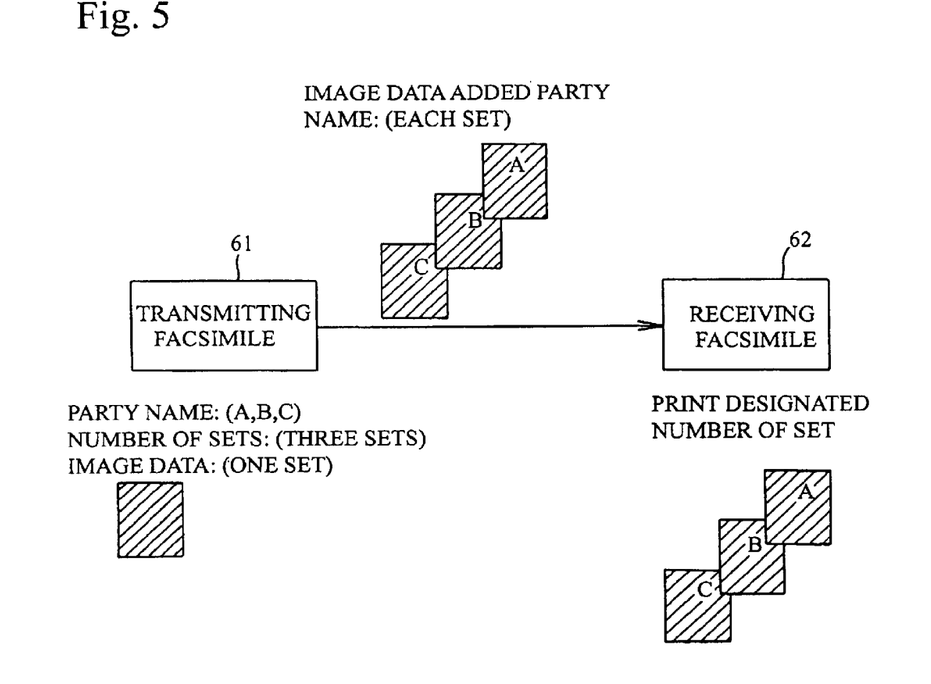

FIGS. 3 through 5 are drawings to explain the sequence of operations by which original image data is transmitted in the facsimile 10. In FIGS. 3 through 5, the facsimile 10 is explained with reference to a transmitting facsimile 61 or a receiving facsimile 62.

In FIGS. 3 through 5, the user inputs into the transmitting facsimile 61 the number of sets of images to be printed by the receiving facsimile 62 and data pertaining to the parties designated to receive each set of printed images. When the transmitting facsimile is instructed by means of the operation unit 52 (see FIG. 2) to transmit the original document image data, it dials the receiving facsimile 62, whereupon it becomes connected to the receiving facsimile 62 via telephone lines. When the connection via telephone lines is established, the transmitting facsimile 61 obtains, via polling, data regarding what processing functions the receiving facsimile 62 has, as shown in FIG. 3.

Different data is transmitted by the transmitting facsimile 61 depending on whether the receiving facsimile 62 is equipped with a function by which it can print multiple sets of original document images based on the data set in the transmitting facsimile 61 regarding the number of sets of images to be printed.

FIG. 4 is a drawing to explain the data transmitted from the transmitting facsimile 61 where the receiving facsimile 62 is equipped with a function by which it can print a designated number of sets of original document images based on the single transmitted set of original document images.

Referring to FIG. 4, in this situation, the transmitting facsimile 61 transmits data regarding the number of sets to be printed and data regarding the names of each of the parties to receive one set of original document images as well as image data of one set of original images. In response to this data transmitted from the transmitting facsimile 61, the receiving facsimile 62 prepares receiving party name image data based on the received receiving party name data, prints out receiving party name images for each receiving party on the header portion of each page, and prints out the original document images on the non-header portion of each page.

In this way, where the receiving facsimile 62 is equipped with a function by which it can print out a designated number of sets of a single set of original document images, the receiving facsimile 62 receives the data transmitted from the transmitting facsimile 61, prepares the data, and prints out the number of sets of images designated in the data regarding the number of sets to be printed.

FIG. 5 is a drawing to explain the data transmitted from the transmitting facsimile 61 where the receiving facsimile 62 is not equipped with a function by which it can print out a designated number of sets of original document images.

In this case, the transmitting facsimile 61 first prepares receiving party name image data based on the receiving party name data, then adds the receiving party name image data to the top of the original document image data, so that image data with the receiving party name attached will be prepared for each set. Next, the transmitting facsimile 61 transmits the designated number of sets of images based on the original document image data to each set of which the receiving party's name is added and the data regarding the number of sets to be printed.

In this way, where the receiving facsimile 62 is not equipped with a function by which it can print out a designated number of sets of original document images based on a single set of original document images, the transmitting facsimile 61 prepares the designated number of sets of image data. The receiving facsimile 62 then receives the prepared image data and prints out the number of sets of images designated by means of the data regarding the number of sets to be printed out.

Figure 6:
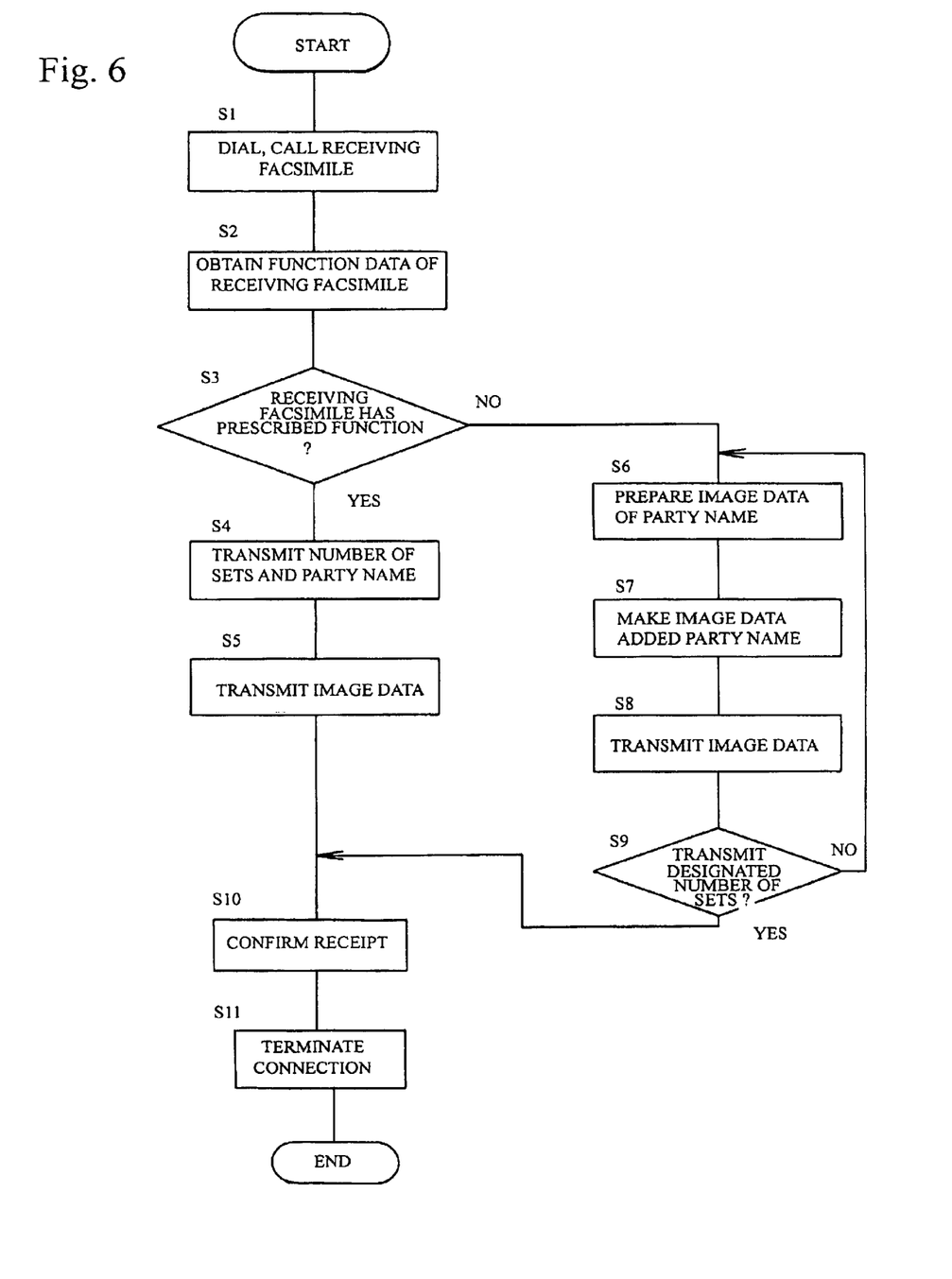
FIG. 6 is a flow chart showing the control sequence of the facsimile.

The control sequence for the transmitting facsimile 61 to perform the processing explained with reference to FIGS. 4 and 5 explained above will now be explained. FIG. 6 is a flow chart to explain the control sequence by which the transmitting facsimile 61 performs the processing shown in FIGS. 4 and 5.

Referring to FIG. 6, when the transmitting facsimile 61 is instructed to transmit the original document image data, first, in step S1, the receiving facsimile (the receiving facsimile 62 in FIGS. 3 through 5) is dialed. In this step, the receiving facsimile 62 that comprises the transmission target is called and connected to the transmitting facsimile via telephone lines. In step S2, data regarding the function by which processing may be performed by the receiving facsimile 62 is obtained via polling. Next, in step S3, it is determined whether or not the receiving facsimile 62 that comprises the transmission target has a function by which a designated number of sets of original document images may be printed out from a single set of original document images.

Where the receiving facsimile 62 has such a function, the determination YES is made in step S3, and as explained with reference to FIG. 4, data regarding the number of sets to be printed and receiving party name data for each set of images is transmitted in step S4, one set of the original document image data is transmitted in step S5, whereupon the process advances to step S10.

On the other hand, where the receiving facsimile 62 is not equipped with the function described above, the determination NO is made in step S3, and as described with reference to FIG. 5, receiving party name image data is prepared in step S6, receiving party name image data is added to the top of the original document image data in step S7, and one set of the image data to which the receiving party name data is added is transmitted in step S8. Next, it is determined in step S9 whether or not the designated number of sets of image data were transmitted. If the designated number of sets were not transmitted (NO in step S9), the process returns to step S6, while if the designated number of sets were transmitted (YES in step S9), the process advances to step S10.

When image data transmission is completed, the receipt of the transmission by the receiving facsimile is confirmed in step S10, and the telephone line connection is terminated in step S11, whereupon processing is completed.

As described above, where the receiving facsimile 62 does not have a function to print a designated number of sets of images from the transmission of one set of original document images, the sending facsimile 61 transmits the original document image data the designated number of times. Because of this function, the receiving facsimile 62 can print the designated number of sets of images even if it is not equipped with a function to process data regarding the number of sets of images designated by the transmitting facsimile 61.

A facsimile comprising a variation of the present invention will now be explained below.

Figure 7:
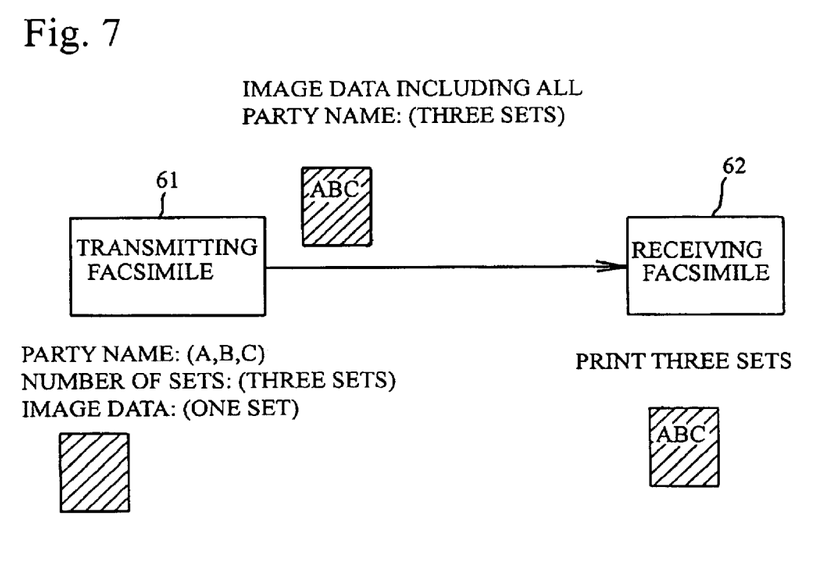
FIG. 7 is a drawing explaining the sequence of operations by which original images are transmitted in a first variation of the present invention.

FIG. 7 is a drawing to explain the transmission of image data from a facsimile that comprises a first variation of the present invention where the receiving facsimile does not have a function to print the designated number of sets of images from the transmission of one set of original document images.

The transmitting facsimile 61 of this variation, instead of preparing receiving party name image data for each set of printed image data in the manner of the transmitting facsimile 61 described above, prepares data regarding the names of all receiving parties, adds this data to the top of the original document image data, then prepares original document image data to which the names of all receiving parties are added.

As described above, where the receiving facsimile 62 is not equipped with a function to print the designated number of sets of images based on a single set of original document images, the transmitting facsimile 61 that comprises the facsimile of this variation transmits the original document image data the designated number of times. With this function, the receiving facsimile 62 can print out the designated number of sets of images even if it is not equipped with a function to process data regarding the number of sets designated by the transmitting facsimile 61 for printing.

In addition, the transmitting facsimile 61 may be equipped with a mode to select whether to transmit one set or multiple sets of the original document image data with the names of all receiving parties added.

A facsimile comprising a second variation of the present invention will now be explained with reference to FIGS. 8 through 10. In this variation, the receiving facsimile 62 has a special feature regarding the images it prints. In other words, in this variation, when the receiving facsimile 62 prints out multiple sets of images from a single set of original document images, it indicates in the printed images that it is printing these multiple sets.

Figure 8:
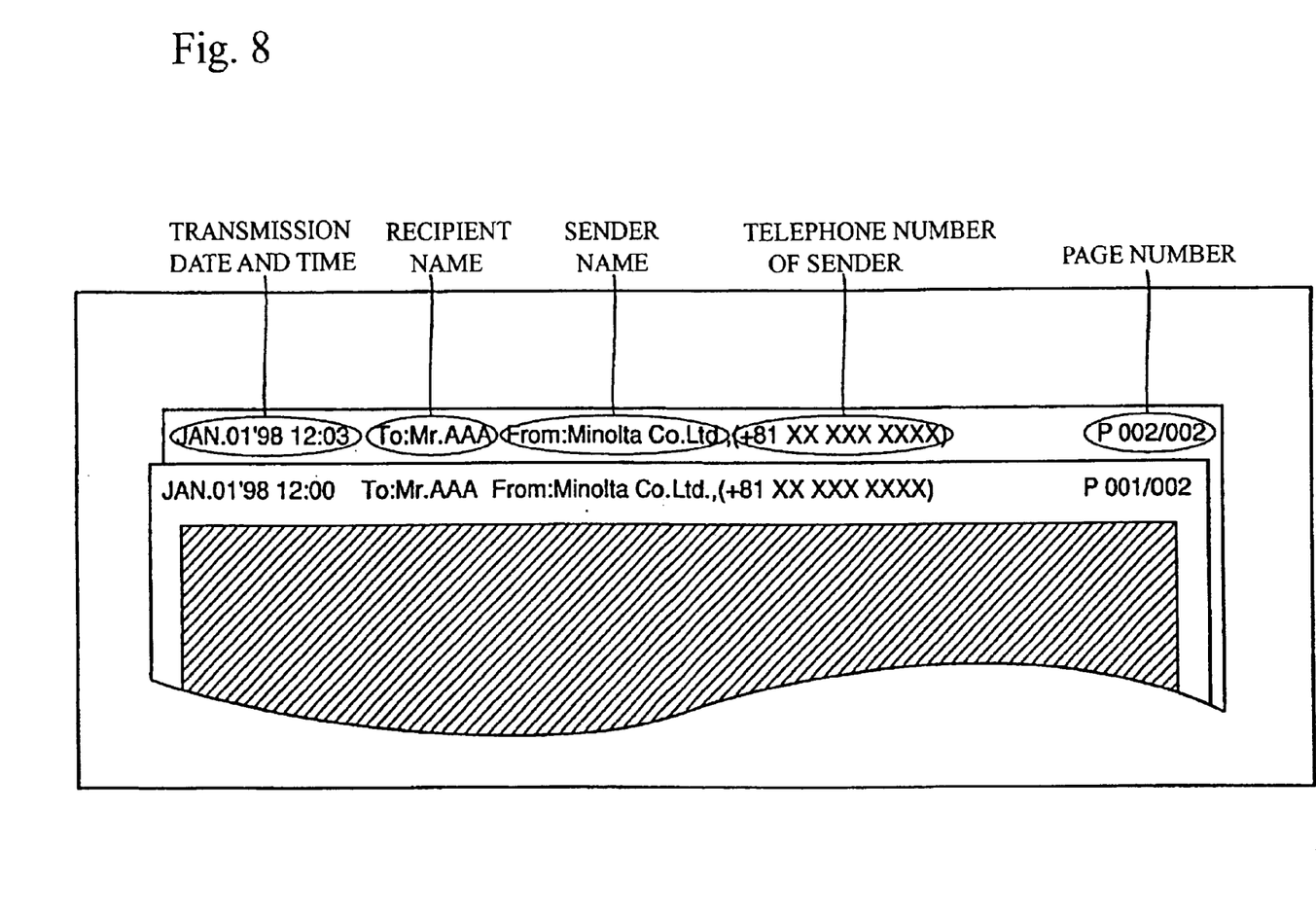
FIGS. 8, 9, and 10 are drawings showing sample output images.

FIG. 8 is a drawing showing an example of the printed images where only one set of images is printed from one set of original document images. FIGS. 9 and 10 are drawings showing examples in which multiple sets of images are printed out from one set of original document images, as explained with reference to FIGS. 4 and 5. First, with reference to FIG. 8, where the receiving facsimile 62 prints out only one set of images from one set of original document images, the transmission date and time, the name of the recipient, the name of the sender, the telephone number of the sender, and the page number are printed at the top of the recording sheet containing the printed images as a header.

Figure 9:
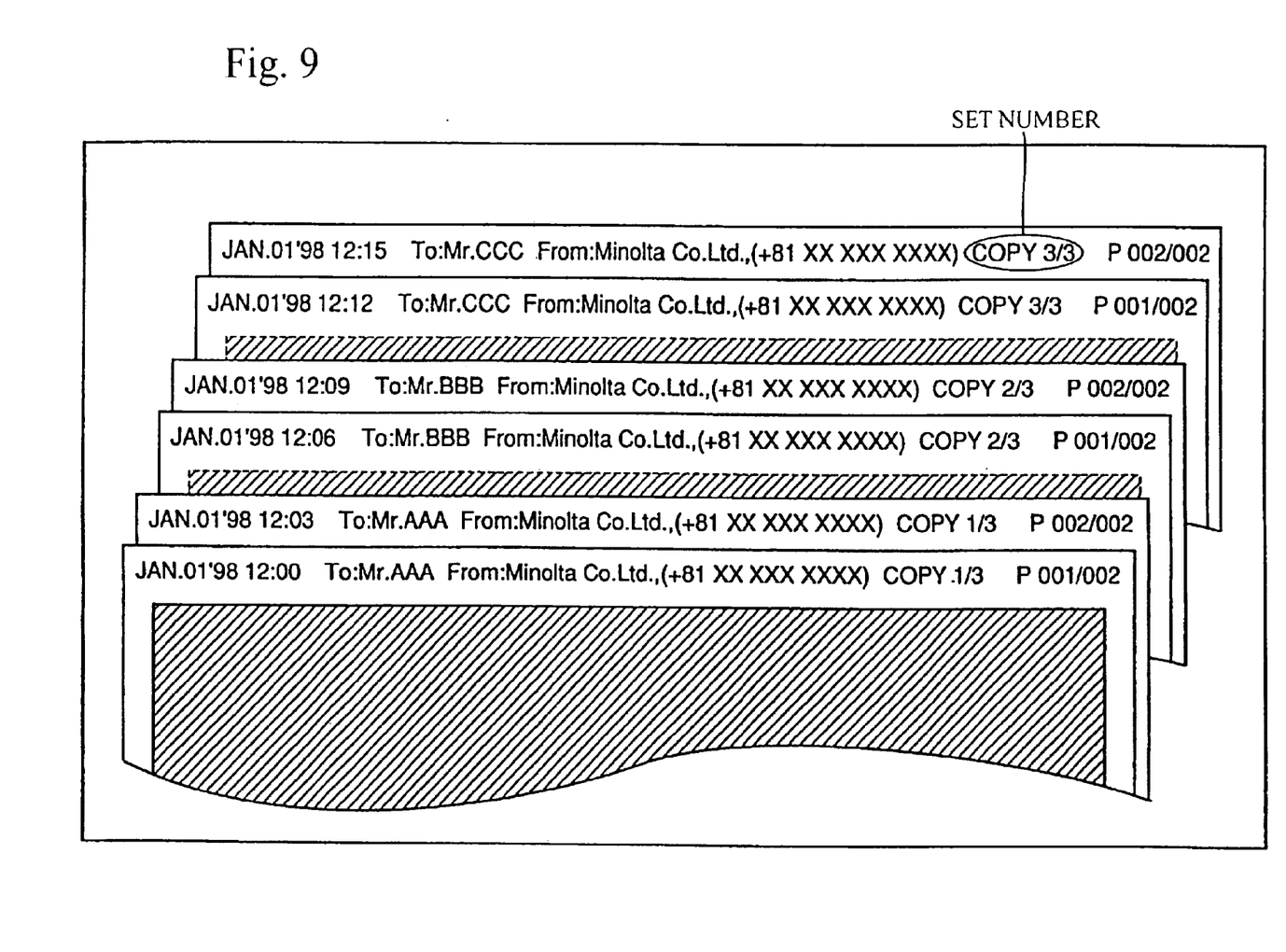

On the other hand, with reference to FIG. 9, where the receiving facsimile 62 prints out multiple sets of images from one set of original document images, in addition to the transmission date and time, the name of the recipient, the name of the sender, the telephone number of the sender, and the page number, the set number is also printed at the top of the recording sheet containing the printed images as a header. Here, the set number is a number indicating how many sets are printed from one set of original document images and which set the current images represent. By printing the set number, the user can recognize that when the receiving facsimile 62 is printing out multiple sets from one set of original document images, it is not the result of erroneous operation of the facsimile, but that data indicating that multiple sets should be printed was transmitted. Therefore, in this case, the situation in which the user retains only one set of the multiple sets of printed images and discards the rest may be avoided.

With reference to FIG. 9, in the present variation, three sets of a two-page set of original document images are printed. In other words, in this variation, images are printed on a total of six sheets of the recording paper. In this variation, in the printed images, the page numbers are not sequential over all three sets, but are calculated individually for each set. In other words, where six sheets of recording paper are used, page numbers are allocated not as page 1 through page 6, but as page 1 through page 2 for each set. As a result, it is easy for the user of the receiving facsimile 62 to recognize that the same sets of images were printed multiple times. In addition, the location of the transmission date and time and other transmission information is not limited to the top of the page. The information may also be printed out at the bottom of the page as a footer, as shown in FIG. 10.

Next, the control sequence for the transmitting facsimile 61 in this variation will be explained. FIG. 11 is a flow chart to explain the control sequence for the transmitting facsimile 61 to perform the processing explained with reference to FIGS. 9 and 10. The processes shown in FIG. 11 are essentially identical to the processes shown in FIG. 6. In other words, with reference to the processes taking place in steps S21 through S31 shown in FIG. 11, the processes of steps S21 through S25 correspond to the processes of steps S1 through S5 in FIG. 6, while the processes of steps S30 and S31 correspond to the processes of steps S10 and S11 in FIG. 6. The processes of steps S26 through S29 shown in FIG. 11 will be explained below.

In step S23, where it is determined that the receiving facsimile 62 does not have a function to print out multiple sets of images from a single set of original document images, the receiving party name image data including the set number data described above is prepared in step S26. In step S27, the receiving party name image data including the set number data prepared in step S26 is added to the top of the original document image data. In step S28, one set of original document image data to which the receiving party name was added in step S27 is transmitted. In step S29, it is determined whether or not the designated number of sets of image data were transmitted, and if they were, the process advances to step S30, while if they were not, the process returns to step S26.

Figure 12:
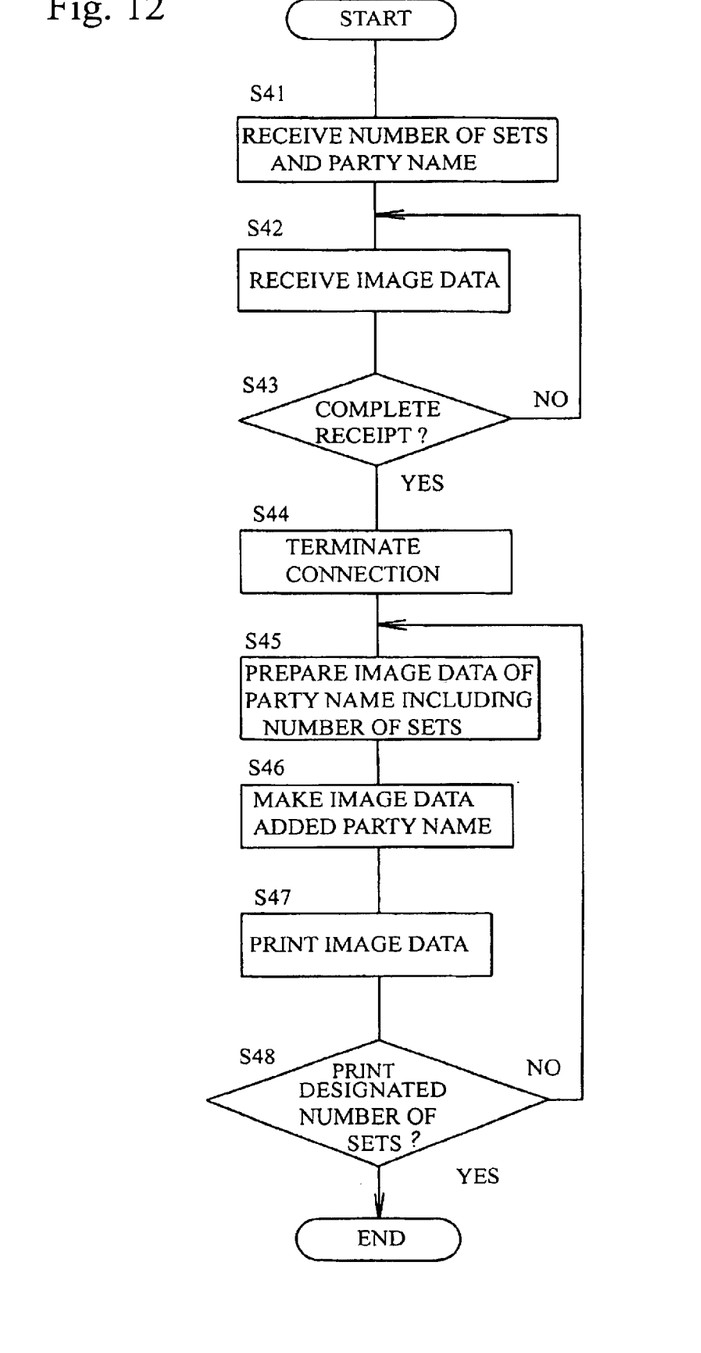
FIG. 12 is a flow chart showing the sequence of operations by which transmitted image data is output in the facsimile of the second variation of the present invention.

FIG. 12 is a flow chart to explain the control sequence for the receiving facsimile 62 of the embodiment of the present invention.

With reference to FIG. 12, if the image data has been transmitted by the transmitting facsimile 61, data regarding the number of sets of images to be printed from the single set of original image data and data regarding the name and telephone number of the party from whom the data was transmitted is received in step S41.

In step S42, image data for one set of original document images is received, and where it is determined in step S43 that the receipt of the transmission is completed, processing to terminate the telephone connection to the transmitting facsimile 61 is performed in step S44.

Figure 10:
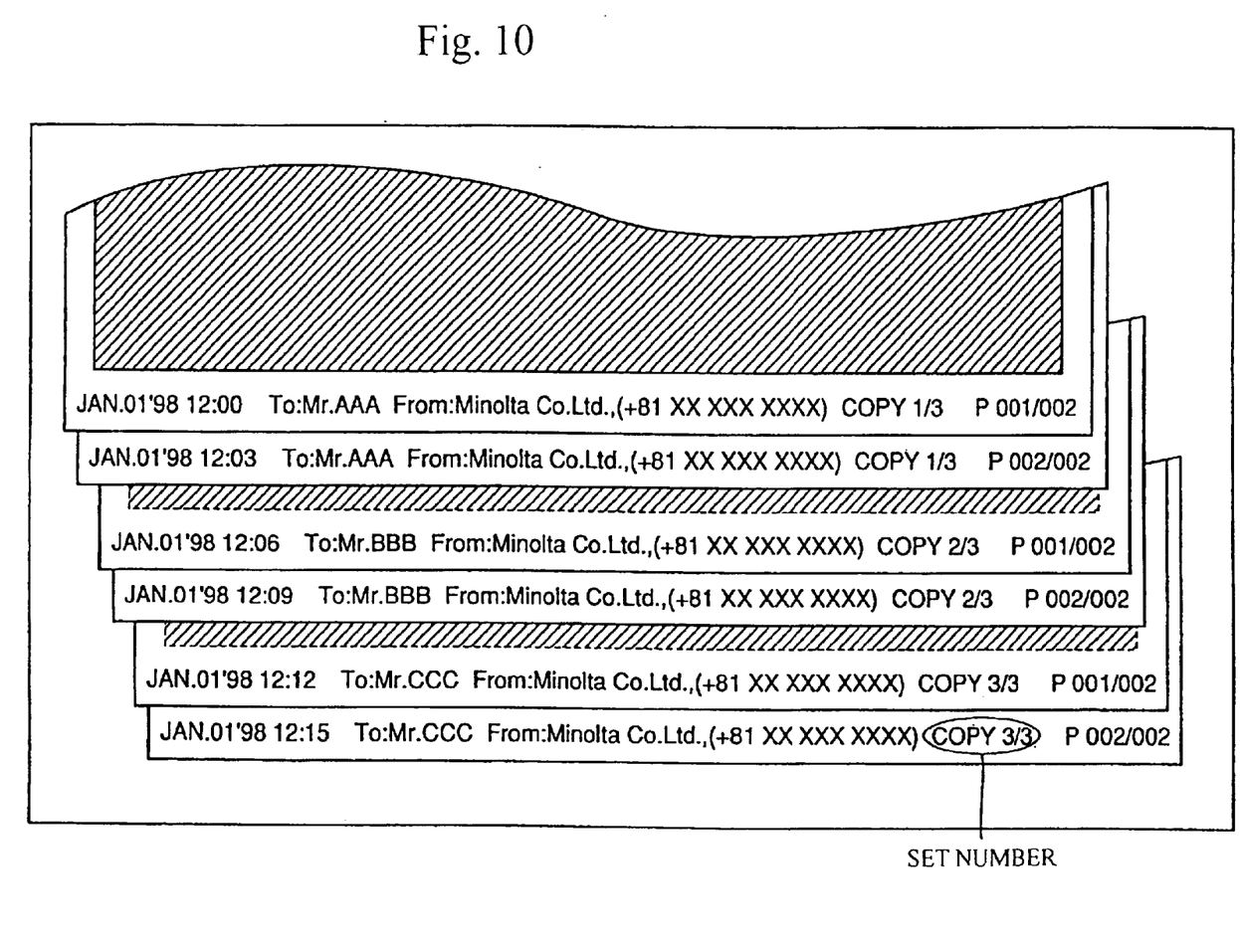
Figure 11:
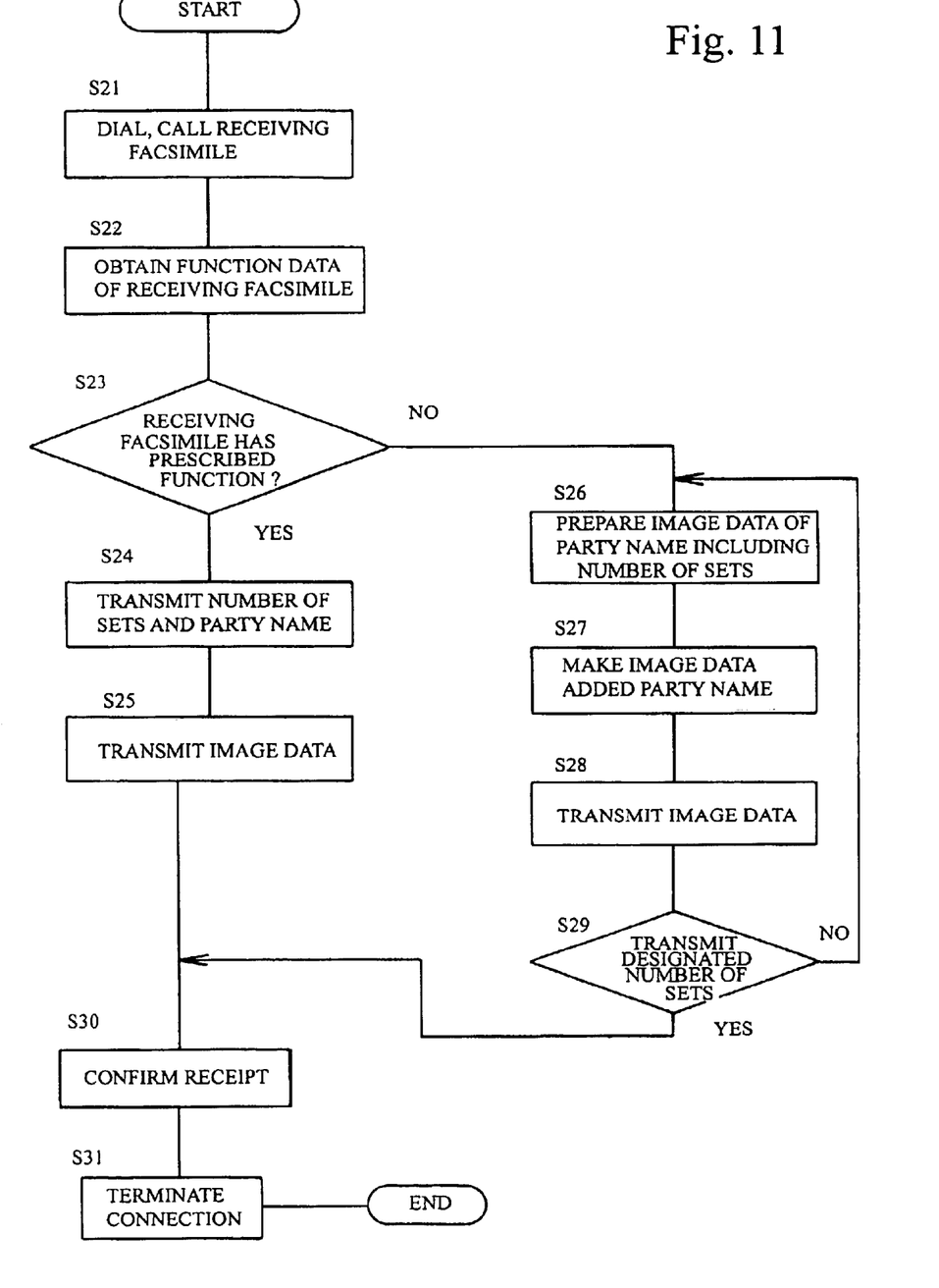
FIG. 11 is a flow chart showing the sequence of operations by which image data is transmitted in the facsimile of a second variation of the present invention.

In step S45, header or footer image data including the set number as shown in FIG. 9 or 10 is prepared, while in step S46, data for printing onto the recording sheet is prepared by combining the header or footer image data prepared in step S45 with the original document image data.

In step S47, the image data prepared in step S46 is printed onto the recording sheet. It is then determined in step S48 whether or not the printing of the number of sets received in step S41 has been completed. If it is determined that the printing has not been completed, the process returns to step S45, while if it is determined that it has been completed, the routine is terminated.

In the embodiment of the present invention explained above, the receiving facsimile 62 comprises the image forming apparatus that forms images based on the original document image data, while the transmitting facsimile 61 comprises the image transmitting apparatus that transmits image data to the image forming apparatus based on a single set of original document image data and designates the number of sets of images to be formed by the image forming apparatus based on the original document image data.

In addition, as described with reference to FIG. 9, in the printed images, the page numbers are not sequential over all three sets, but are allocated in sequence for each set beginning with the first page of the set, indicating page information for the images in each set.

Moreover, as explained with reference to FIGS. 9, 10 and 12, when the receiving facsimile 62 forms multiple images, by printing the set number in the printed images, where the image transmitting apparatus designates that multiple sets of images are to be formed, the multiple sets of images are formed together with images that indicate that the images are formed by the image forming apparatus in multiple sets. The printing of the set number in the images printed by the receiving facsimile 62 as described above may be performed whether or not the receiving facsimile 62 has a function to print the designated number of sets of images from a single set of original document images.

The embodiment disclosed herein is in all respects an example of the present invention, which should not be considered as limited thereto. The scope of the present invention is not limited to the explanation provided herein, but is indicated by the claims, and it is intended that all changes within the equivalent meaning and scope of the claims are included herein.

What is claimed is:

1. An image transmitting apparatus comprising:
   a designate unit which designates a number of sets of printing images;
   a transmitter which transmits data indicating said designated number of sets and image data representing a single set of printing images to a receiving apparatus; and
   a controller which controls said transmitter to transmit said image data multiple times when said receiving apparatus cannot form multiple sets of printing images based on said data indicating designated number of sets and said image data.

2. An image transmitting apparatus according to claim 1, further comprising:
   an image processor which adds a number image to indicate information regarding the number of sets to said image data when said receiving apparatus cannot form multiple sets of printing images.

3. An image transmitting apparatus according to claim 2, wherein said number image is added in a header area of said printing images.

4. An image transmitting apparatus according to claim 2, wherein said number image is added in a footer area of said printing images.

5. An image transmitting apparatus according to claim 2, wherein said information regarding the number of sets includes pages and said number of sets.

6. An image transmitting apparatus according to claim 5, wherein said number image is added in a header area of printing images.

7. An image transmitting apparatus according to claim 5, wherein said number image is added in a footer area of printing images.

8. An image transmitting apparatus according to claim 1, wherein said designate unit further designates a party name to which said printing images are to be distributed and said transmitter transmits said data and image data to said party name.

9. An image forming apparatus comprising:
   a receiver which receives a number of sets of printing images and printing images;

an image processor which forms an image to indicate said number of sets of printing images; and print unit which prints said printing images and which prints said indicating image on each printing image.

10. An apparatus according to claim 9, wherein said print unit prints said indicating image in a header area of printing images.

11. An apparatus according to claim 9, wherein said print unit prints said indicating image in a footer area of printing images.

12. An image transmitting method comprising the steps of:

designating a number of sets of printing images;

determining whether a receiving apparatus can form multiple sets of printing images based on said designated number of sets; and transmitting image data representing a single set of said printing images multiple times when it is determined that said receiving apparatus cannot form multiple sets of printing images based on said designated number of sets.

13. An image transmitting method according to claim 12, wherein at said transmitting step image data indicating said number of sets is further transmitted.

14. An image transmitting apparatus comprising:

a designate unit which designates a number of sets of printing images;

a transmitter which transmits data indicating said number of sets and image data representing a single set of said printing images to a receiving apparatus and which obtains data regarding processing functions said receiving apparatus handles from said receiving apparatus; and a controller which controls said transmitter to transmit said image data multiple times when it is determined based on said obtained data that said receiving apparatus does not handle a processing function to form multiple sets of printing images based on said data indicating designated number of sets and said image data.

15. An image transmitting method comprising the steps of:

designating a number of sets of printing images;

determining from data received from a receiving apparatus whether said receiving apparatus is equipped with a function to form multiple sets of said printing images based on said designated number of sets; and transmitting image data representing a single set of said printing images multiple times when it is determined that said receiving apparatus is not equipped with said function.

* * * * *